Nov. 16, 1943.   W. G. DANIEL   2,334,388
ATTACHABLE SIDE WALL FOR TIRES
Filed Nov. 12, 1941
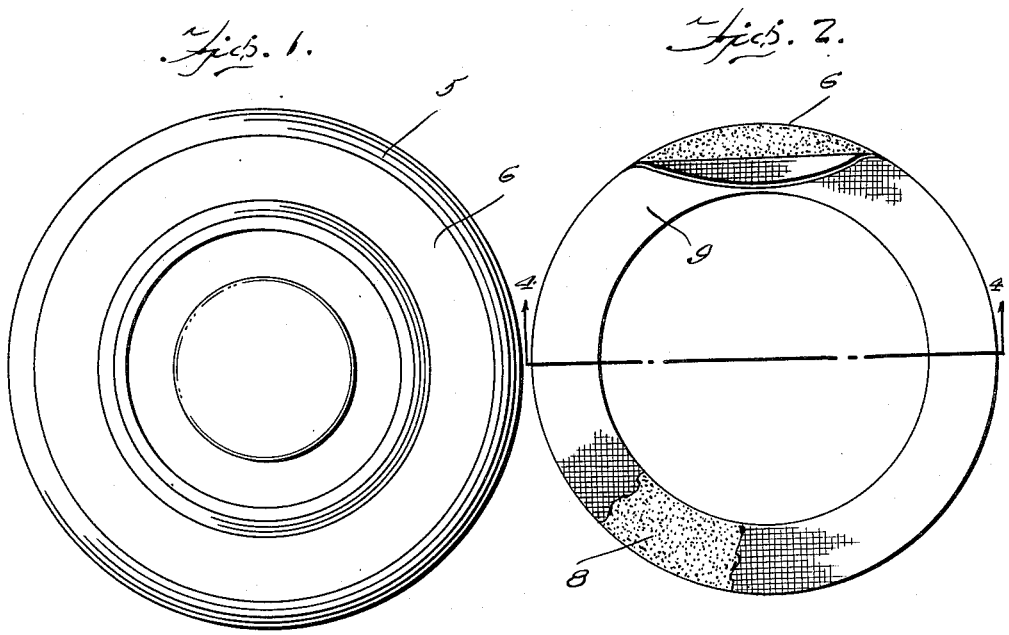
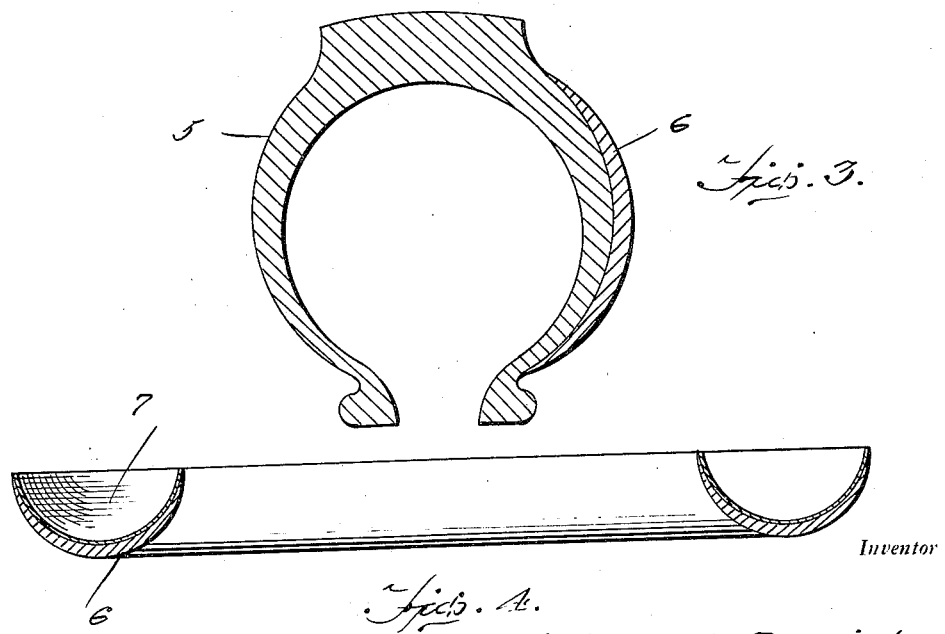
Inventor
William G. Daniel
By Clarence A. O'Brien
Attorney Patented Nov. 16, 1943

2,334,388

UNITED STATES PATENT OFFICE 2,334,388

ATTACHABLE SIDE WALL FOR TIRES

William Glenn Daniel, Miami, Fla.

Application November 12, 1941. Serial No. 418,799

1 Claim. (Cl. 41—34)

The present invention relates to new and useful improvements in tires and has for its primary object to provide means for easily and quickly attaching an ornamental side wall to a pneumatic, solid or other vehicle tire.

A further object of the invention is to provide an attachable side wall for a tire of neat and attractive appearance, which is relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which:

Figure 1 is a side elevational view of a tire casing showing the attachable side wall in position thereon.

Figure 2 is a rear elevational view of the attachable side wall with parts broken away and shown in section.

Figure 3 is a transverse sectional view of the tire casing, and

Figure 4 is a sectional view taken substantially on a line 4—4 of Figure 2.

Referring now to the drawing in detail, the numeral 5 designates a conventional form of automobile tire casing and the numeral 6 designates an attachable side wall which may be constructed of any suitable material, such as fabric, or a suitable yielding or flexible composition adapted to be molded into a predetermined shape.

As shown to advantage in Figure 4 of the drawing the attachable side wall is molded in the form of a ring having a curved channel 7 extending circumferentially at one side thereof and its opposite side transversely convexed to produce a substantially crescent-shaped ring member in cross-section, adapted to conformably fit against the side wall of the tire casing 5 as shown in Figure 3 of the drawing. It will be understood, however, that the ring member may be constructed of any desired cross-sectional contour.

The inner side of the attachable side wall is coated with an adhesive substance 8 by means of which the member may be secured in position to the side wall of the casing.

In order to protect the adhesive substance prior to applying the side wall to the casing, I provide a fabric protective cover 9, preferably constructed of cloth or similar suitable material which is placed over the adhesive substance to protect the same from foreign matter until the side wall is ready to be attached to the tire casing.

The attachable side wall 6 may be constructed of any color to suit the individual taste of the owner of the car and may be easily and quickly secured in position after the protective cover 9 has been removed.

It is believed the details of construction, advantages and manner of use of the invention will be readily understood from the foregoing without further detailed explanation.

Having thus described the invention what I claim is:

An ornamental disk for attachment to the side wall of a tire, said disk having a concave wall corresponding in shape to the contour of an inflated tire and having edge portions disposed in spaced relation to the inner and outer peripheries of the tire when applied thereto, said disk contrasting in color with the tire including black and white, and adapted to be cemented to the side wall thereof.

WILLIAM G. DANIEL.